US009807016B1

(12) United States Patent
Sarangapani et al.

(10) Patent No.: US 9,807,016 B1
(45) Date of Patent: Oct. 31, 2017

(54) REDUCING SERVICE DISRUPTION USING MULTIPLE VIRTUAL IP ADDRESSES FOR A SERVICE LOAD BALANCER (71) Applicant: Juniper Networks, Inc., Sunnyvale, CA (US)

(72) Inventors: Srivathsa Sarangapani, Bangalore (IN); Aneesh Rajendran, Bangalore (IN); Kamalakumar Kuppuswamy, Tamail Nadu (IN)

(73) Assignee: Juniper Networks, Inc., Sunnyvale, CA (US)

( * ) Notice: Subject to any disclaimer, the term of this patent is extended or adjusted under 35 U.S.C. 154(b) by 219 days.

(21) Appl. No.: 14/869,866

(22) Filed: Sep. 29, 2015

(51) Int. Cl.
*G01R 31/08* (2006.01)
*H04H 20/71* (2008.01)
*H04L 12/803* (2013.01)
*H04L 29/12* (2006.01)
*H04L 29/08* (2006.01)

(52) U.S. Cl.
CPC ............ *H04L 47/125* (2013.01); *H04L 61/10* (2013.01); *H04L 67/02* (2013.01)

(58) Field of Classification Search
CPC .................................................... H04L 47/125
See application file for complete search history.

(56) References Cited

U.S. PATENT DOCUMENTS

| 6,578,066 | B1* | 6/2003 | Logan | H04L 29/12009 370/312 |
| 6,606,316 | B1* | 8/2003 | Albert | H04L 41/046 370/389 |
| 8,243,589 | B1* | 8/2012 | Trost | H04L 67/1034 370/220 |
| 8,432,791 | B1* | 4/2013 | Masters | H04L 1/22 370/221 |
| 2003/0217064 | A1* | 11/2003 | Walters | G06F 9/466 |
| 2005/0259658 | A1* | 11/2005 | Logan | H04L 67/306 370/392 |
| 2007/0061887 | A1* | 3/2007 | Hoover | G06F 21/6218 726/26 |
| 2007/0098014 | A1* | 5/2007 | Pomaranski | H04L 47/14 370/468 |
| 2008/0263205 | A1* | 10/2008 | Naseh | H04L 29/12367 709/226 |
| 2009/0037998 | A1* | 2/2009 | Adhya | G06Q 20/027 726/11 |

(Continued)

*Primary Examiner* — Gerald Smarth
(74) *Attorney, Agent, or Firm* — Shumaker & Sieffert, P.A.

(57) ABSTRACT

Techniques may include mapping, by a service node, a first virtual address for a particular service to private addresses that identify servers, wherein each server provides the particular service, and wherein a URL for the service resolves to the first virtual address. The techniques may include configuring a service load balancer of the service node to load balance network traffic for the first virtual address across the servers and forwarding network traffic for the first virtual address between the servers and subscriber devices. The techniques may include, associating a second virtual address with a subset of the private addresses that excludes the private address for the at least one server, and causing the URL to resolve to the second virtual address. The techniques may include forwarding network traffic for the first virtual address between the servers and the subset of the subscriber devices.

20 Claims, 5 Drawing Sheets (56) References Cited

U.S. PATENT DOCUMENTS

2016/0021026 A1* 1/2016 Aron ................. H04L 47/827
　　　　　　　　　　　　　　　　　　　　　　709/226
2017/0013049 A1* 1/2017 Patil ................. H04L 67/1002

* cited by examiner

REDUCING SERVICE DISRUPTION USING MULTIPLE VIRTUAL IP ADDRESSES FOR A SERVICE LOAD BALANCER

TECHNICAL FIELD

The disclosure relates to computer networks and, more specifically, to load balancing packet flows transported by computer networks.

BACKGROUND

A network service provider offers services to subscribers that access a service provider core network using an access network. Services offered may include, for example, traditional Internet access, Voice-over-Internet Protocol (VoIP), video and multimedia services, and security services. The service provider network may support multiple types of access network infrastructures that connect to service provider network access gateways to provide access to the offered services. Services may also be offered by a third-party content provider, e.g., to which the service provider offers connectivity.

Heterogeneous access networks connect many thousands of subscribers to any number of access gateway types, such as Broadband Remote Access Servers (BRASs), Cable Modem Termination Systems (CMTSs), and Gateway GPRS Support Nodes (GGSNs), that may have varying capabilities and scalability limitations and yet face ever-increasing demands for both subscriber connection management and subscriber-specific traffic management services. Although an access gateway, as a connection terminus and thus a transport node for all subscriber traffic for a particular subscriber device, is an established location at which to perform subscriber-specific traffic management services, coupling subscriber access and traffic management at an access gateway may restrict or prevent independent scaling and independent optimization of these disparate functions.

As a result, a service provider may deploy one or more service nodes in the service provider (SP) core network, upstream from the access gateways, to route traffic through the network to servers that provide the subscriber services and to apply carrier edge services such as firewall, carrier grade network address translation (CG-NAT), and load balancing of packet flows for subscribers among one or more servers that provide the subscriber services. In this way, the service nodes are decoupled from the subscriber access management functions and thus may be optimized for service processing.

SUMMARY

In general, techniques are described for reducing dropped connections with subscriber devices when transitioning one or more real servers offline in a load-balanced configuration. For instance, a service load balancer implemented at service node may be positioned in a network between a set of subscriber devices and a set of real servers that each provide the same service to the set of subscribers. A subscriber device utilizes the service by initially submitting a request for a URL that resolves to a first virtual address. The first virtual address may have been previously generated by the service node and mapped to the private addresses for each of the real servers, such that the service load balancer can load balance network traffic for the first virtual address across the set of real servers. When the subscriber device receives the first virtual address, the subscriber device may submit a request to the service node and the service load balancer may forward the request to one of the real servers.

In some instances, one or more real servers may become overloaded with traffic and/or require maintenance or upgrades. Rather than immediately taking the one or more servers offline and disrupting existing connections with subscribers, the service node may generate a second virtual address. The second virtual address corresponds to a subset of the overall set of real servers, where the subset excludes the one or more servers that will no longer service new connections. The service load balancer can therefore load balance network traffic for the second virtual address across the subset of real servers. The service node may also cause the URL to resolve to the second, different virtual address, such that new connections based on the URL are serviced by the service load balancer using the second virtual address rather than the first virtual address. In this way, new connections for the service are distributed to the subset of real servers, while existing connections to the one or more servers that no longer service new connections will expire or terminate over a period of time. The one or more servers that no longer service new connections may then be taken offline to reduce overloading and/or perform maintenance or upgrades. Such techniques may smooth the transition of one or more real servers offline and divert traffic to other real servers, rather than abruptly terminating subscriber connections, thereby potentially reducing the number of dropped connections with subscriber devices.

In some examples, a method may include mapping, by a service node, a first virtual address for a particular service to a plurality of private addresses that identify a plurality of servers, wherein each server provides the particular service, and wherein a Uniform Resource Locator (URL) for the service resolves to the first virtual address; configuring a service load balancer of the service node to load balance network traffic for the first virtual address across the servers and forwarding, by the service node, network traffic for the first virtual address between the servers and a plurality of subscriber devices; in response to determining that at least one server of plurality of servers will no longer service new connections for the service from the subscriber devices, associating a second virtual address with a subset of the private addresses that excludes the private address for the at least one server, and causing the URL to resolve to the second virtual address; and in response to configuring the service load balancer of the service node to load balance network traffic for the second virtual address across the subset of the servers, forwarding, by the service node, network traffic for the first virtual address between the servers and the subset of the subscriber devices.

In some examples, a service node includes: a forwarding unit; a service load balancer implemented in the forwarding unit; a control unit that maps a first virtual address for a particular service to a plurality of private addresses that identify a plurality of servers, wherein each server provides the particular service, and wherein a Uniform Resource Locator (URL) for the service resolves to the first virtual address; wherein the control unit configures the service load balancer of the service node to load balance network traffic for the first virtual address across the servers and forwarding, by the service node, network traffic for the first virtual address between the servers and a plurality of subscriber devices; wherein the control unit, in response to determining that at least one server of plurality of servers will no longer service new connections for the service from the subscriber devices, associates a second virtual address with a subset of the private addresses that excludes the private address for the at least one server, and causes the URL to resolve to the second virtual address; and wherein the forwarding unit, in response to configuring the service load balancer of the service node to load balance network traffic for the second virtual address across the subset of the servers, forwards network traffic for the first virtual address between the servers and the subset of the subscriber devices.

In some examples, a computer-readable medium includes instructions for causing at least one programmable processor of a service node to: maps a first virtual address for a particular service to a plurality of private addresses that identify a plurality of servers, wherein each server provides the particular service, and wherein a Uniform Resource Locator (URL) for the service resolves to the first virtual address; configures a service load balancer of the service node to load balance network traffic for the first virtual address across the servers and forwarding, by the service node, network traffic for the first virtual address between the servers and a plurality of subscriber devices; in response to determining that at least one server of plurality of servers will no longer service new connections for the service from the subscriber devices, associates a second virtual address with a subset of the private addresses that excludes the private address for the at least one server, and causing the URL to resolve to the second virtual address; and in response to configuring the service load balancer of the service node to load balance network traffic for the second virtual address across the subset of the servers, forwards network traffic for the first virtual address between the servers and the subset of the subscriber devices.

The details of one or more embodiments are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
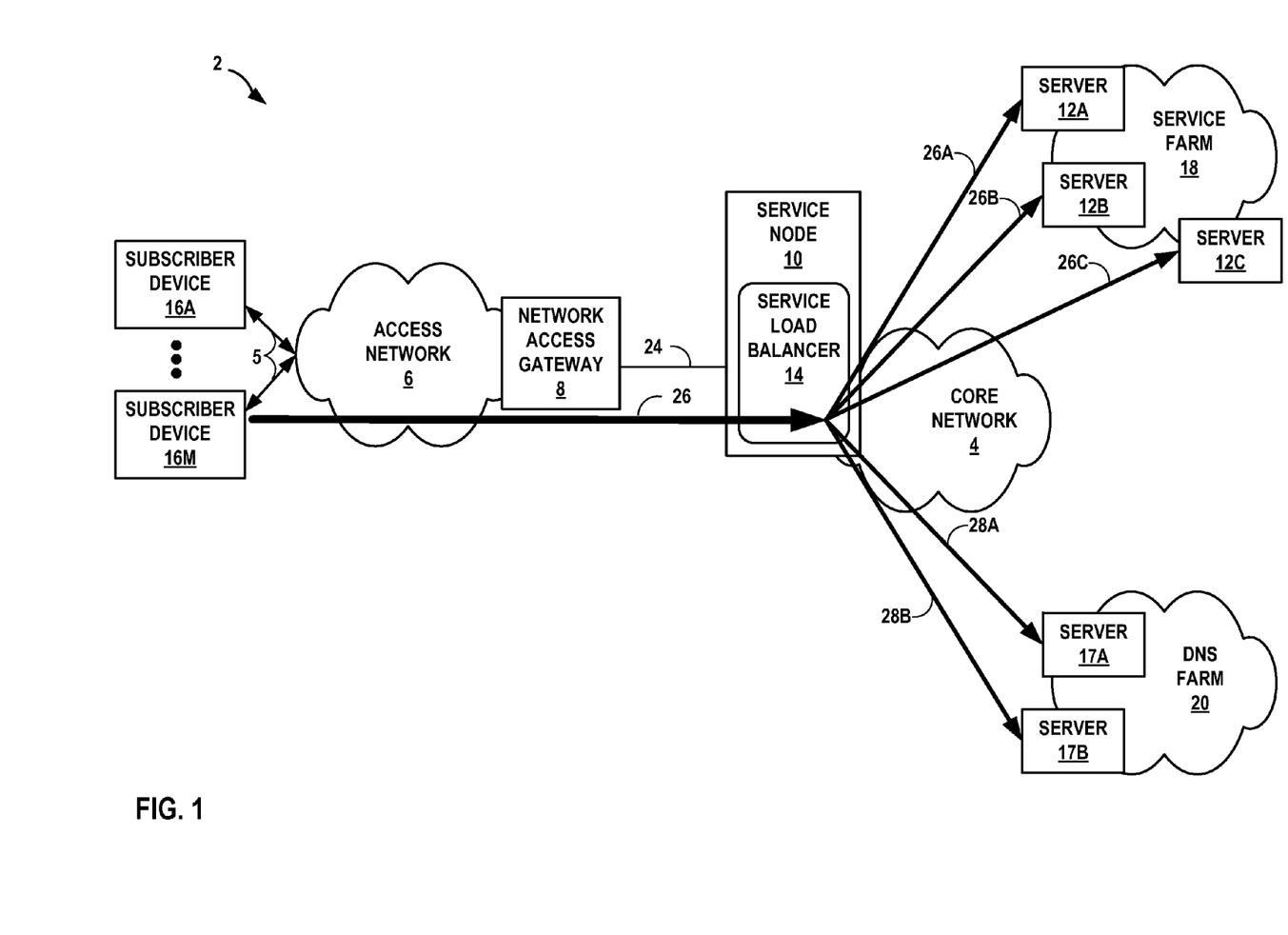
FIG. 1 is block diagrams illustrating an example network system having a service node positioned upstream from an access network to apply load balancing services according to techniques described in this disclosure.

FIG. 1 is block diagrams illustrating an example network system 2 having a service node 10 positioned upstream from an access network 6 to apply load balancing services according to techniques described in this disclosure. In the example of FIG. 1, service node 10 is coupled to access network 6 by way of network access gateway 8. However, FIG. 1 is merely exemplary and the techniques described herein may be used in other network configurations to provide carrier edge services, in particular stateless load balancing to packet flows accessing subscriber services. For example, services node 10, and the functionality described herein with respect to load balanced services, may be integrated within gateway 8 or other device of network system 2.

Servers 12A-12C (collectively, "servers 12") offer to subscriber devices 16A-16M (collectively, "subscriber devices 16") a subscriber service, such as, an HTTP server, FTP server, traditional Internet access, Voice-over-Internet Protocol (VoIP), content delivery, video and multimedia services, data collection, and security services, for example. Some or all of servers 12 may represent a separate physical computing device, also referred to as "real servers." Alternatively, or in addition, some or all of servers 12 may represent different virtual machines executing on real servers. In some instances, one or more of servers 12 may each represent multiple servers, e.g., a server farm or cluster of a service complex provided by network system 2. Each of servers 12 may present an independent interface accessible to packets traversing core network 4. For example, each of servers 12 may be assigned a different network (IP) address that is addressable by service node 10. As another example, servers 12 may be identifiable according to a label switched path (LSP), pseudowire (PW), or other tunneling protocol tunnel identifier that service node 10 may use to forward traffic to an identified one of servers 12. Servers 12 may be part of a data center, service complex, and/or enterprise. In some examples, service node 10 may be located at or otherwise integrated within one or more devices of the data center or service complex. As shown in FIG. 1, each of servers 12 may be included in a service farm 18, which may a separate network coupled to core network 4. In some examples, servers 12 may be included in core network 4 and service farm 18 may be a part of core network 4.

Service provider core network 4 ("core network 4") offers packet-based connectivity to subscriber devices 16A-16M attached to access network 6 for accessing servers 12. Core network 4 may represent a public network that is owned and operated by a service provider to interconnect a plurality of networks, such as access network 6. Core network 4 may implement Multi-Protocol Label Switching (MPLS) forwarding and in such instances may be referred to as an MPLS network or MPLS backbone. In some instances, core network 4 represents a plurality of interconnected autonomous systems, such as the Internet, that offers services from one or more service providers. Servers 12 may be located within an edge network coupled to core network 4, e.g., by a customer edge device such as customer edge switch or router, or alternatively, servers 12 may be directly connected to core network 4.

A network service provider operates or in some cases leases elements of access network 6 to provide packet transport between subscriber devices 16 and network access gateway 8. Access network 6 represents a network that aggregates data traffic from one or more subscribers for transport to/from core network 4 of the service provider. Access network 6 includes network nodes that execute communication protocols to transport control and user data to facilitate communication between subscriber devices 16 and network access gateway 8. Access network 6 may include a broadband access network, cellular access network, a wireless LAN, a public switched telephone network (PSTN), or other type of access network. Examples of cellular access networks include networks conforming to a Universal Mobile Telecommunications System (UMTS) architecture, an evolution of UMTS referred to as Long Term Evolution (LTE), mobile IP standardized by the Internet Engineering Task Force (IETF), as well as other standards proposed by the 3$^{rd}$ Generation Partnership Project (3GPP), 3$^{rd}$ Generation Partnership Project 2 (3GGP/2) and the Worldwide Interoperability for Microwave Access (Wi-MAX) forum.

In examples of network system 2 that include a cellular access network as access network 6, network access gateway 8 may represent a mobile gateway, for example, a Gateway General Packet Radio Service (GPRS) Serving Node (GGSN), an Access Gateway (aGW), or a Packet Data Network (PDN) Gateway (P-GW). In such examples, interface 24 may represent a Gi and/or SGi interface (or "reference point"). In examples of network system 2 that include a wireline/broadband access network, network access gateway 8 may represent a Broadband Services Router (BSR) or a Broadband Remote Access Server (BRAS), for instance.

A network service provider that administers at least parts of network system 2 offers services to subscribers associated with devices, e.g., subscriber devices 16, which access the service provider network. Services offered may include, for example, traditional Internet access, Voice-over-Internet Protocol (VoIP), video and multimedia services, and security services. As described above with respect to access network 6, core network 4 may support multiple types of access network infrastructures that connect to service provider network access gateways to provide access to the offered services. In some instances, network system may include subscriber devices 16 that attach to multiple different access networks 6 having varying architectures yet all coupled by interface 24 to service node 10 that may be inline for packet flows between subscriber devices 16 and servers 12.

Subscriber devices 16A-16N (collectively, "subscriber devices 16") connect to network access gateway 8 via access network 6 to receive connectivity to subscriber services for applications hosted by subscriber devices 16. Each of subscriber devices 16 may comprise, for example, a mobile phone, a smart phone, a desktop/laptop computer, a gaming console, a video-conferencing suite, a workstation, a wireless device, a network-ready appliance, a file server, print server, a digital subscriber line (DSL) router, a cable modem, or another device with which to access services provided by network system 2, e.g., servers 12. A subscriber may represent, for instance, an enterprise, a residential subscriber, or a mobile subscriber. Subscriber devices 16 connect to access network via access links 5 that comprise wired and/or wireless communication link. The term "communication link," as used herein, comprises any form of transport medium, wired or wireless, and can include intermediate nodes such as network devices. Each of access links 5 may comprise, for instance, aspects of an asymmetric DSL network, WiMAX, a T-1 line, an Integrated Service Digital Network (ISDN), wired Ethernet, or a cellular radio link.

Any one or more of subscriber devices 16 may begin sending subscriber data traffic toward core network 4 in order to access and receive the service provided by servers 12, and such packets traverse service node 10 as part of at least one packet flow. Flows 26 illustrated in FIG. 1 represent one or more upstream packet flows from any one or more subscriber devices 16 and directed to the service interface (e.g., one or more IP addresses mapped to servers 12) for the service provided by servers 12. The term "packet flow," "traffic flow," or simply "flow" refers to a set of packets originating from a particular source device and sent to a particular destination device as part of a communication session between the source and destination device. A flow of packets, in either the upstream (sourced by one of subscriber devices 16) or downstream (destined for one of subscriber devices 16) direction, may be identified by the 5-tuple: <source network address, destination network address, source port, destination port, protocol>. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet.

Service node 10 relays subscriber data traffic between access network 6 and core network 4. That is, service node 10 is upstream (i.e., core side) of access network 6 that terminates subscriber-specific connections so as to produce packet-based communications, e.g., Internet Protocol (IP) packets. Moreover, service node 10 is illustrated in the example topology of FIG. 1 as positioned between access network 6 and core network 4 that provides a packet-based infrastructure for accessing network resources, such servers 12. In this way, service node 10 may be considered an intermediate network device. Communication links of interface 24 couple service node 10 to access network 6 and core network 4. In some cases, all network traffic exchanged between access network 6 and servers 12 traverses service node 10 such that service node 10 may be considered inline between access network and servers 12. In some instances, service node 10 constitutes part of core network 4 as an intermediate network device to transport packets between access network 6 and other parts of core network 4. In some instances, service node 10 may represent an application delivery controller (ADC) or other network device that load balances packet flows among servers of a data center. In some instances, service node 10 may represent a services delivery gateway (SDG). As used herein, a "service node device" refers to any device, such as a server, appliance, service card or other component, or other computing device programmed to perform the functionality of service node 10 described herein.

In addition to relaying traffic, service node 10 may apply one or more carrier edge services such as firewall, carrier grade network address translation (CG-NAT), media optimization, IPSec/VPN, subscriber management, etc., and load balancing of packet flows among one or more servers that provide the subscriber services. Service load balancer 14 performs load balancing of flows 26 among the servers 12 to balance the distribution of flow processing among the servers 12 for the servers. Service load balancer 14 of service node 10 may be "stateless" in FIG. 1 because the service load balancer 14 does not store, in the general case, state data that maps a particular flow to a particular one or servers 12 such that service load balancer 14 may direct subsequent packets for the flow to the mapped server 12. Instead, in the general or steady-state case, service load balancer 14 processes each packet for flows 26 without using state data created based on previous packets of flows 26 while nevertheless maintaining flow affinity for flows 26 to servers 12.

As one example, to load balance a packet in the general case, service load balancer 14 applies a hashing function the packet. In some examples, service load balancer 14 applies the hashing function to the packet by applying the hashing function to an n-tuple of the packet. As used herein, "hash a packet" or similar phrase refers to an operation to apply the hashing function to the packet, e.g., to one of the n-tuples (e.g., n-IP-tuples) of the packet.

Each hash index (or "hash bucket") of the hashing function maps to a single one of servers 12, and service node 10 forwards the packet to the one of servers 12 mapped to the hash index for the n-tuple of the packet. Because the n-tuple for each packet in a flow is equivalent, the service load balancer 14 may in this way consistently distribute packets for the packet flow to the same one of servers 12 and facilitate service continuity for the session. As used herein, to "hash a packet to a hash index" or similar phrase refers to an operation to apply the hashing function to the packet to determine the hash index for the packet.

System 2 may also include a Domain Name System (DNS) farm 20. DNS farm 20 may include one or more servers 17A-17B ("servers 17"), which provide domain name translation services. Each of servers 17 may include a combination of hardware and software that translate domain names into IP addresses. Accordingly, each of servers 17 may receive requests that include a Uniform Resource Locators (URL) and provide a response that includes an IP address, which corresponds to the URL. As shown in FIG. 1, each of servers 17 may be included in a DNS farm 20, which may a separate network coupled to core network 4. In some examples, servers 17 may be included in core network 4 and DNS farm 20 may be a part of core network 4. Although FIG. 1 describes the use of DNS farm 20, techniques of the disclosure are not limited to DNS resolution to provide VIPs, and any suitable implementation to provide VIP (other than DNS) and that could be made to listen to service load balancer instructions are contemplated within the spirit and scope of this disclosure.

In the example of FIG. 1, servers 17 may store mappings between virtual IP addresses (VIPs) and URLs. In some examples, service node 10 configures a VIP that is mapped to a set of real IP addresses (RIPs), where each respective RIP is a private IP address for a respective one of servers 12. For instance, a VIP may be mapped to a set of RIPs for a particular service, such that each of the servers for the corresponding RIPs provides the same service. As such, a VIP may represent or correspond to a particular service provided by multiple real servers 12. To illustrate, service node 10 may generate a mapping for a VIP_1 to RIPs for each of servers 12A-12C, which each provide an HTTP service. By mapping VIP_1 to the RIPs for each of servers 12A-12C, service node 10, when receiving a request from one of subscriber devices 16 with a destination of IP of VIP_1, will load balance the request to one of servers 12A-12C that are mapped to VIP_1.

Figure 2:
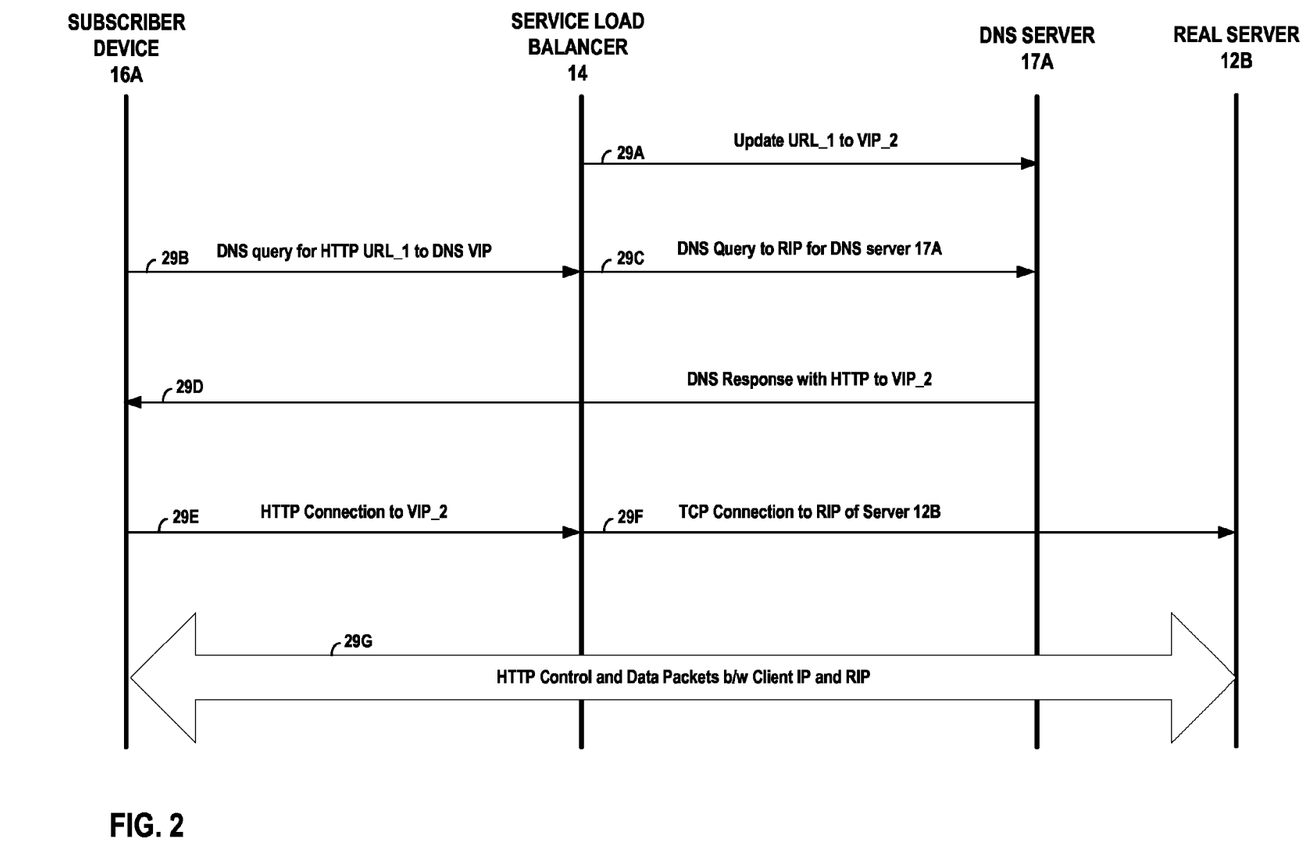
FIG. 2 is a sequence diagram illustrating an example set of operations in accordance with techniques of this disclosure.

Subscriber devices 16 access services of service farm 18 via URLs for specific services. Servers 17 may be configured with mappings between such URLs and VIPs generated by service node 10. For instance, a specific URL_1 for a service may be mapped by service node 10 to VIP_1, and this mapping may be stored in servers 17. As such, if subscriber device 16A submits a request to access a particular service that corresponds to URL_1 for VIP_1, one of servers 17 will provide a response that includes VIP_1 to subscriber device 16A. When subscriber device 16A receives VIP_1, subscriber device 16A will submit a request using VIP_1 as the destination IP address to service node 10. Service load balancer 14 may apply a load balancing operation to route the request to one of servers 12. Because service load balancer 14 has stored a mapping between VIP_1 and the RIPs for servers 12, service local balancer 14 is able to direct the request for the service to the appropriate real server. FIG. 2 provides further details of the request/response sequence for a subscriber device to establish a connection with a real server.

In some instances, an administrator may need to perform maintenance and/or upgrades on one or more of servers 12. Typically, performing such maintenance and/or upgrades is service interruptive, and has usually been performed in a maintenance window, which is normally a low traffic time period. Administrators have, in the past, manually taken real servers offline, although connections still existed, and performed the changes. However, in such techniques, many existing client connections may be interrupted, even despite performing such operations in low traffic time periods.

Techniques of this disclosure, may use multiple VIPs for a particular virtual service, rather than a single VIP, to improve the transitioning of a real server offline. Referring to FIG. 1, each of VIP_1 is mapped to the RIPs for each of servers 12A-12C in service node 10 and servers 17 include a mapping between URL_1 for an HTTP virtual service (VS), named VS_1. As new requests from subscriber devices 16 that include URL_1 are received by servers 17, responses are provided by servers 17 to subscriber devices 16 with VIP_1. Subscriber devices 16 submit requests that include VIP_1 for VS_1 to service load balancer 14, which load balances the requests across servers 12A-12C.

While each of servers 12A-12C are providing services to subscriber devices 16, an administrator or automated component may need to take server 12A offline for maintenance and upgrades, and therefore take server 12A out of active operation. The administrator or automated component may notify service node 10 directly based on a user input or event, or the service node 10 may receive the notification to take server 12A out of active operation from a remote device, such as server 12A, a client device of the administrator, or any other remote device. Upon receiving the notification, rather than immediately taking server 12A out of active operation (and thereby disconnecting existing subscriber devices from VS_1), service node 10 may generate a second VIP_2 that is mapped to RIPs for servers 12B-12C but not server 12A. Service node 10 may send information to servers 17 that indicates a mapping between URL_1 and VIP_2. Servers 17 may update its mapping for URL_1 to VIP_2, such that servers 17, when receiving requests indicating URL_1 will provide responses with VIP_2 rather than VIP_1. In this way, servers 17 will resolve URL_1 to a new VIP_2 that does not include the server 12A that will be taken out of active operation.

As a result of updating the mapping for URL_1 to VIP_2 in servers 17, requests for URL_1 will resolve to VIP_2 and not VIP_1. Accordingly, subscriber devices submitting requests for VS_1, after URL_1 has been updated to resolve to VIP_2, will submit requests that include VIP_2 as the destination IP address to service node 10. Service load balancer 14, which maps VIP_2 to RIPs for servers 12B-12C, will load balance the requests across servers 12B-12C, excluding server 12A. In this way, new connections are directed to servers 12B-12C while existing connections to server 12A are allowed to expire or disconnect. In some examples, service node 10 will keep a snapshot of current view of service farm 18, and all existing connection request to VIP_1 may be distributed to server 12A as per the view before the change to VIP_2 in servers 17. As such, traffic to VIP_1 for existing connections will get distributed to an old view that includes server 12A, and VIP_2 for new connections will be served by a new view that includes servers 12B-12C and excludes server 12A.

As new connections will use a DNS query and resolve to VIP_2 only, the to-be upgraded server 12A will not receive the new connections and once the existing connections get timed out. The to-be upgraded server 12A may no longer carry any traffic or the amount of traffic may be reduced to only long-lived flows. For instance, service node 10 may stop forwarding network traffic for server 12A and/or remove server 12A from active operation after a defined period of time. That is, service node 10 may continue, for a defined period of time after updating the mapping for URL_1 to VIP_2, to forward packets for existing connections with router 12A. In some examples, the defined period of time may be set by an administrator or hard-coded within service node 10. As an example, after updating the mapping for URL_1 to VIP_2, service load balancer may set a timer with an interval equal to the defined period of time. Prior to expiration of the timer, service node 10 may continue to forward packets for existing connections with router 12A for VIP_1, but upon expiration of the timer, service node 10 may no longer forward packets for existing connections with router 12A for VIP_1.

In some examples, service node 10 may continue to forward packets for existing connections with router 12A for VIP_1 until the number of connections with router 12A falls below a threshold. In some examples, the threshold may be set by an administrator or hard-coded within service node 10. As an example, after updating the mapping for URL_1 to VIP_2, service load balancer may periodically determine the number of connections to server router 12A. Prior to the number of connections falling below the threshold, service node 10 may continue to forward packets for existing connections with router 12A for VIP_1, but upon determining that the number of connections falls below the threshold, service node 10 may no longer forward packets for existing connections with router 12A for VIP_1.

Once service node 10 has determined that a timer has expired or the number of sessions has fall below the threshold, to name two non-limiting, possible conditions, server 12A may be taken out of active operation. In some examples, an administrator or automated component may send one or more commands to server 12A to perform maintenance and/or upgrades. During this time, subscriber requests for VS_1 will be serviced by servers 12B-12C.

Once maintenance and/or upgrades have been applied to server 12A, service node 10 may be notified that server 12A is ready to be placed back into active operation. For instance, an administrator or automated component may notify service node 10 directly based on a user input or event, or service node 10 may receive the notification to place server 12A back into active operation from a remote device, such as server 12A, a client device of the administrator, or any other remote device.

Upon receiving the notification, service node 10 may generate a third VIP_3 that is mapped to RIPs for servers 12A-12C, or alternative select previously generated VIP_1. In the example of FIG. 1, service node 10 may send information to servers 17 that indicates a mapping between URL_1 and VIP_1. Servers 17 may update its mapping for URL_1 to VIP_1, such that servers 17, when receiving requests indicating URL_1 will provide responses with VIP_1 rather than VIP_2. In this way, servers 17 will resolve URL_1 to VIP_1 that includes all of servers 12A-12C.

As a result of updating the mapping for URL_1 to VIP_1 in servers 17, requests for URL_1 will resolve to VIP_1 and not VIP_2. Accordingly, subscriber devices submitting requests for VS_1, after URL_1 has been updated to resolve to VIP_1, will submit requests that include VIP_1 as the destination IP address to service node 10. Service node 10, which maps VIP_1 to RIPs for servers 12A-12C, will load balance the requests across servers 12A-12C, including server 12A. In this way, new connections are directed to servers 12A-12C. In this reverse operation of re-adding server 12A, an intermediate view that excludes server 12A for VIP_2 will be kept until connections to VIP_2 are disconnected and new connections are established to a current view for VIP_1. Similar to the techniques described above, service node 10 may use a timer and/or connection threshold to determine when to stop forwarding network traffic for VIP_2.

In the example above, service node 10 may be operating in a direct server return mode, in which service node 10 is configured to listen for multiple VIPs. In such examples, upstream traffic from subscriber devices to service node 10 includes a source IP address for the subscriber device and a destination IP address for the VIP. Downstream traffic to the subscriber devices includes the VIP as the source address and the subscriber IP address as the destination address.

If however, service node 10 is operating in a translated mode, upstream traffic from subscriber devices specifies a subscriber IP address and subscriber port number as the source information for the packet, and the VIP and virtual port as the destination information for the packet. Upstream traffic from service node 10 to a real server includes subscriber IP address and subscriber port number as the source information for the packet, and the RIP and correspond real server port for the real server as the destination information. Downstream traffic from the real server to service node 10 includes the RIP and corresponding port for the RIP as the source information for the packet, and the subscriber device and subscriber port as the destination information for the packet. Downstream traffic from service node 10 to the subscriber device specifies the VIP and virtual port as the source information for the packet, and the client IP address and client port as the destination information for the packet. In translated mode, a real server need not have VIP IP configured, and hence for enabling service node 10 to distinguish the return traffic (to translate packet source IP from RIP to VIP), service node 10 has to listen to N real server listening ports instead of 1.

FIG. 2 is a sequence diagram illustrating an example set of operations in accordance with techniques of this disclosure. The example operations are described with respect to components of FIG. 1. In particular, FIG. 2 illustrates operations in response to service node 10 being notified that real server 12A will be taken out of active operation. For instance, as described in FIG. 1, an administrator may need to perform maintenance and/or upgrades on server 12A. Upon receiving the notification for server 12A, rather than immediately taking server 12A out of active operation, service node 10 may generate a second VIP_2 that is mapped to RIPs for servers 12B-12C but not server 12A. Service node 10 may send information to server 17A that indicates a mapping between URL_1 and VIP_2 (29A). Server 17A may update its mapping for URL_1 to VIP_2, such that server 17A, when receiving requests indicating URL_1, will provide responses with VIP_2 rather than VIP_1.

Subscriber device 16A may later submit a request for URL_1, which has been updated at DNS server 17A to resolve to VIP_2 (29B). Service node 10, may forward the request to DNS server 17A, which resolves URL_1 to VIP_2 (29C). DNS server 17A provides a response to subscriber device 16A that includes VIP_2 (29D). Upon receiving the response that includes VIP_2, subscriber device 16A may send a connection request with VIP_2 as the destination IP address to server load balancer 14 (29E). Server load balancer 14, which previously generated VIP_2 and mapped the RIPs of real servers 12B-12C to VIP_2, may load balance the request to server 12B (29F). Real server 12B may receive the request and begin sending network traffic back to subscriber device 16A. At this point, subscriber device 16A may exchange control and data packets for the VS_1 service with real server 12B (29G).

Figure 3:
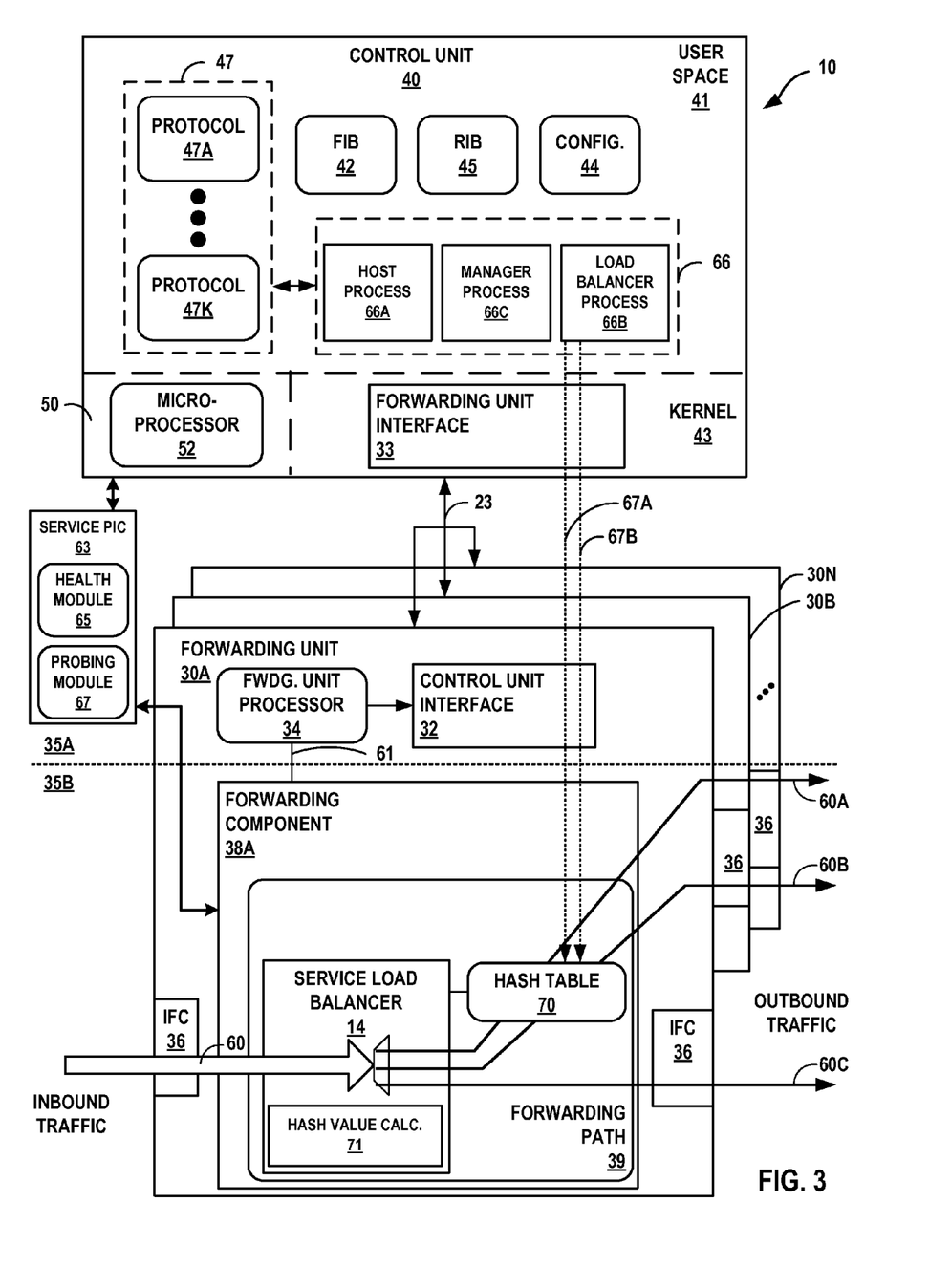
FIG. 3 is a block diagram illustrating an example service node that applies stateless load balancing according to techniques described herein.

FIG. 3 is a block diagram illustrating an example service node that applies stateless load balancing according to techniques described herein. Service node 10 illustrated in FIG. 2 may represent an example instance of service node 10 of FIG. 1 in further detail. In some examples, service node 10 may be a physical router that includes a combination of hardware and/or software to implement a service load balancer.

In this example, control unit 40 includes a combination of hardware and software that provides a control plane 35A operating environment for execution of one or more user-level host processes 66, of which host process 66A and load balancer process 66B are provided as examples, executing in user space 41. By way of example, host processes 66 may include a command-line interface and/or graphical user interface process to receive and respond to administrative directives in accordance with one or more of protocols 47, a routing protocol module to execute one or more routing protocols of protocols 47, a network management process to execute one or more network management protocols of protocols 47, an address resolution protocol (ARP) process to respond to ARP requests according to an ARP protocol of protocols 47, a subscriber management process to manage subscriber session setup and maintenance in accordance with one or more subscriber session management protocols (e.g., GPRS Tunneling Protocol-C(ontrol)), and so forth. In this respect, control unit 40 may provide routing plane, service plane, and management plane functionality for service node 10.

Host processes 66, including load balancer process 66B, execute on and interact with kernel 43, which provides a run-time operating environment for user-level processes. Kernel 43 may represent, for example, a UNIX operating system derivative such as Linux or Berkeley Software Distribution (BSD). Kernel 43 offers libraries and drivers by which host processes 66 may interact with the underlying system. Hardware environment 50 of control unit 40 includes microprocessor 52 that executes program instructions loaded into a main memory (not shown in FIG. 2) from a storage device (also not shown in FIG. 2) in order to execute the software stack, including both kernel 43 and user space 41, of control unit 40. Microprocessor 52 may represent one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

In this example, a routing protocol process of host processes 66 executes one or more interior and/or exterior routing protocols to exchange routing information with other network devices and store received routing information in routing information base 45 ("RIB 45"). RIB 45 may include information defining a topology of a network, including one or more routing tables and/or link-state databases. The routing protocol process resolves the topology defined by routing information in RIB 45 to select or determine one or more active routes through the network and then installs these routes to forwarding information base 42 ("FIB 42"). Typically, the routing protocol process generates FIB 42 in the form of a radix or other lookup tree to map packet information (e.g., header information having destination information and/or a label stack) to next hops and ultimately to interface ports of interface cards associated with respective forwarding units 30A-30N.

Service node 10 also includes a plurality of forwarding units 30A-30N (collectively, "forwarding units 30") and a switch fabric (not shown) that together provide a forwarding plane 35B for forwarding network traffic. Forwarding units 30 connect to control unit 40 in this example by communication links 23, which may represent an Ethernet network.

Each of forwarding units 30 may include substantially similar components performing substantially similar functionality, said components and functionality being described hereinafter primarily with respect to forwarding unit 30A illustrated in detail in FIG. 3. Forwarding unit 30A receives and sends network packets via interfaces of interface cards (IFCs) 36 of forwarding unit 30A. Forwarding unit 30A also includes forwarding component 38A, which represents hardware or a combination of hardware and software that provide high-speed forwarding of network traffic. Likewise, forwarding unit 30B includes IFCs 36 and forwarding component 38B, and so on. In some examples, one or more of forwarding units 30 may each include multiple forwarding components substantially similar to forwarding component 38A. Example forwarding units include flexible programmable integrated circuit (PIC) concentrators (PFCs), dense port concentrators (DPCs), and modular port concentrators (MPCs). Forwarding units 30 may be alternatively referred to as line cards.

Each of IFCs 36 may include interfaces for various combinations of layer two (L2) technologies, including Ethernet, Gigabit Ethernet (GigE), and Synchronous Optical Networking (SONET) interfaces. In various aspects, each of forwarding units 30 may include more or fewer IFCs. In some examples, each of forwarding components 38 is associated with different IFCs of the forwarding unit 30 on which the forwarding component 38 is located. The switch fabric (again, not shown) connecting forwarding units 30 to one another provides a high-speed interconnect for forwarding incoming transit network packets to the selected one of forwarding units 30 for output over a network interface.

Forwarding units 30 demarcate control plane 35A and forwarding plane 35B of service node 10. That is, forwarding unit 30A performs functions of both control plane 35A and forwarding plane 35B. In general, forwarding component 38A and IFCs 36 implement forwarding plane 35B for forwarding unit 30A, while forwarding unit processor 34 (illustrated as "fwdg. unit processor 34") executes software including control unit interface 32 that implement portions of control plane 35A within forwarding unit 30A. Control unit 40 also implements portions of control plane 35A of service node 10. Forwarding unit processor 34 of forwarding unit 30A manages forwarding component 38A and executes instructions to provide a control unit interface 32 to control unit 40 and handle host-bound or other local network packets. Forwarding unit processor 34 may execute a microkernel for forwarding unit 30A. Bus 61 represents a communication link that enables communication of network packet data and metadata and signaling messages between forwarding unit processor 34 and forwarding component 38A. Bus 61 may include a DMA bus and be controlled, at least in part, by a DMA chip for direct memory copying of stored packet data to computer-readable storage memory (not shown) controlled by forwarding unit processor 62 for analysis and/or to await transport to control unit 40 via communication links 23.

Forwarding component 38A may include programmable ASIC-based packet processors that process network packets by performing a series of operations on each packet over respective internal packet forwarding paths as the packets traverse the internal architecture of service node 10. Forwarding component 38A includes forwarding structures that, when executed, examine the contents of each packet (or another packet property, e.g., incoming interface) and on that basis make forwarding decisions, apply filters, and/or perform accounting, management, traffic analysis, and load balancing, for example. In one example, each of forwarding components 38 arranges forwarding structures as next hop data that can be chained together as a series of "hops" along an internal packet forwarding path for the network device. The result of packet processing determines the manner in which a packet is forwarded or otherwise processed by forwarding components 38 from its input interface on one of forwarding units 30 to its output interface on one of forwarding units 30.

Forwarding component 38A identifies packet properties and performs actions bound to the properties. Forwarding component 38A executes microcode (or "microinstructions") to control and apply fixed hardware components of the ASICs to process packet "keys." A packet key includes packet fields and other parameters that determine a flow of packet processing for the packet along an internal forwarding path. Internal forwarding path 39 ("forwarding path 39") comprises programmed, executable microcode and fixed hardware components that determine the packet processing actions and other operations performed by forwarding component 38A. Forwarding path 39 may include memory logic to store state, configuration data, tables, and so forth. Forwarding path 39 may include, for example, executable instructions, programmable logic, and application-specific logic that perform lookups, rate limit packet flows (e.g., using policers), and manipulate packet keys, among other functions. Internal forwarding paths of service node 10 may include combinations of respective forwarding paths 39 of multiple different forwarding components 38A. In other words, forwarding path 39 of forwarding component 38A may include only a part of the overall internal forwarding path of service node 10 for various packet flows.

An administrative interface process of processes 66, such as a command-line interface or graphical user interface, executes to receive configuration data, which administrative process stores to configuration data 44 (illustrated as "config. 44"). The configuration data may include server load balancing configuration information. Server load balancing configuration information identifies a set of one or more servers, e.g., servers 12 of FIG. 1, associated with a common interface. The server load balancing configuration may identify each of the set of servers by a server identifier that may be, for instance, an IP address (IPv4/IPv6, e.g.), a tunnel identifier, a server farm identifier, or any other server information that enables forwarding units 30 to forward packets to the identified server. For each identified server, the server load balancing configuration may include server capability information that specifies the maximum number of connections, capacity expressed as a percentage of the set of servers, failure indications, and so forth. Load balancer process 66B may use server capability information when apportioning hash indices of hash table 70 among the load-balanced servers. For example, load balancer process 66B may apportion more hash indices to a higher-capacity server. The server load balancing configuration may further identify the common interface, which may include an IP address, IP address/port combination, tunnel identifier, pseudowire identifier, or any other information that enables forwarding units 30 to identify packets that are to be load balanced among the set of servers, e.g., servers 12 of FIG. 1. The common interface may alternatively be referred to as a virtual server, which provides the subscriber service by operations of the set of load-balanced servers.

Load balancer process 66B operating in conjunction with service load balancer 14 and other components of service node 10 of FIG. 2 may represent an example instance of service load balancer 14 of FIG. 2. Load balancer process 66B of control unit 40 may invoke forwarding unit interface 33 to program forwarding path 39 of forwarding component 38A with hash table 70, which includes an entry for each of N hash values for a hash function applied by service load balancer 14. Because each hash value is associated with a different hash table 70 entry, each the hash value range may considered an index to hash table 70. Accordingly, the hash values for the hash function are alternatively referred to as "hash indices." The value for N may be configurable. One example value for N is 256. Each hash table 70 is associated with one of the N hash indices, and load balancer process 66B configures each entry to specify one of the identified servers for load balancing according to configuration data 44. Entries may specify servers by a forwarding next hop structure for forwarding path 39 or by a network address, for instance.

In the example service node 10 of FIG. 2, service load balancer 14 represents logic of forwarding path 39 for distributing packet flows among a set of identified servers that provide a common service to clients/subscribers, e.g., servers 12 of FIG. 1. Service load balancer 14 executed by forwarding component 38A may provide increased throughput over a load balancing processes executed by a general-purpose processor, in some cases by an order of magnitude or more. Forwarding components 38A may be configured with service load balancer 14 that applies stateless or stateful load balancing to received packets.

Forwarding unit 30A receives inbound packets (collectively, "inbound traffic") by IFCs 36, and forwarding component 38A processes the inbound packets using internal forwarding path 39. Forwarding component 38A executing forwarding path 39 identifies inbound packets destined for the common interface for the set of load-balanced servers configured in hash table 70 by load balancer process 66B. Service node 10 is configured to apply traffic load balancing to inbound packets identified in this way. Accordingly, forwarding component 38A directs the identified inbound packets (illustrated collectively as packet flows 60) to service load balancer 14, which load balances individual packet flows 60A-60C among multiple load-balanced servers. In some cases, outbound packet flows 60 egress service node 10 by another one of forwarding units 30B-30N rather than by ingress forwarding unit 30A for the illustrative packet flows 60. In other words, any of forwarding units 30 may ingress and/or egress packet flows being load-balanced. Forwarding components 38 may look up outbound interfaces for and forward transit network packets as outbound traffic via the outbound interfaces of IFCs 36.

Service load balancer 14 may apply a hash function to one or more fields of the packet. For example, service load balancer 14 may apply the hash function to any n-tuple of the packet. In some cases, the service load balancer 14 may apply the hash function to the full 5-tuple of the packet, which is also referred to as an Equal-Cost Multipath (ECMP) hash. Hash value calculator 71 of service load balancer 14 computes the hash function for the input (e.g., the selected n-tuple for the packet), which outputs a hash value that is an index to one of the entries of hash table 70. Hash value calculator 71 is configured to output a hash value within a range corresponding to the number of entries of hash table 70, which may be alternatively referred to as hash buckets. In other words, the hash value calculator 71 computes an index into hash table 70. Hash value calculator 71 may compute the hash function using, e.g., SHA-1, MD5, or a cyclic redundancy check such as CRC32 or CRC64.

As shown in FIG. 3, service node 10 may include a manager process 66C that implements techniques of this disclosure. Manager process 66C may receive RIPs of servers 12A-12C that is stored in configuration data 44. In some examples, RIPs of servers 12A-12C that are stored in configuration data 44 may be manually configured by an administrator. In other examples, RIPs of servers 12A-12C are determined from RIB 45 and stored in configuration data 44. In any case, based on input from an administrator or automated component, manager process 66C generate and/or store a URL_1 in configuration data 44 for a particular service VS_1, as described in FIGS. 1-2. Manager process 66C may further generate a virtual IP address VIP_1 and store an association in configuration data 44 between VIP_1 and the URL_1. Based on input from an administrator or automated component, manager process 66C store in configuration data 44 associations between VIP_1 and the RIPS associated respectively with servers 12A-12C.

Manager process 66C may send information that indicates an association between the URL_1 and VIP_1 to DNS servers 17. As described in FIGS. 1-2, DNS servers 17 store the association between URL_1 and VIP_1, such that upon receiving a request for a translation of the URL_1, DNS servers 17 reply with VIP_1 as the resolved IP address. Manager process 66C may send information to load balancer process 66B that causes service load balancer 14 to load balance network traffic for VIP_1 across servers 12A-12C. Because load balancer process 66B has provided three RIPs for servers 12A-12C to service load balancer 14, in some examples service load balancer 14 may generate three entries in hash table 70 that correspond respectively to each of the three RIPs, and therefore network traffic for VIP_1 will be load balanced across the three RIPs. As service load balancer 14 applies a hashing algorithm to packet flows 60, the packets from packet flows are forwarded by forwarding component 38A, based on lookups in hash table 70, to the corresponding one of servers 12 that corresponds to an entry in hash table 70.

If subscriber device 16A submits a request to access service VS_1 that corresponds to the URL_1 for VIP_1, service load balancer 14 may receive the request and forward the request to one of servers 17, which provides a response to subscriber device 16A that includes VIP_1. When subscriber device 16A receives VIP_1, subscriber device 16A will submit a request using VIP_1 as the destination IP address to service node 10. Service load balancer 14 may apply a load balancing operation and access hash table 70 to route the request to the RIP for one of servers 12, such as server 12A.

Manager process 66C may later receive a notification to take server 12A out of active operation. The notification may be sent by a remote device, such as server 12A, a client device of the administrator, or any other remote device. Based on the notification, manager process 66C may further generate a virtual IP address VIP_2 and store an association in configuration data 44 between VIP_2 and the URL_1. Based on input from an administrator or automated component, manager process 66C stores in configuration data 44 associations between VIP_2 and the RIPS associated respectively with servers 12B-12C, but not server 12A. Manager process 66C sends information that indicates an association between the URL_1 and VIP_2 to DNS servers 17. Using the information, DNS servers 17 update the URL_1 to resolve to VIP_2 rather than VIP_1. In this way, servers 17 will resolve the URL_1 to a new VIP_2 that does not include the server 12A that will be taken out of active operation.

Manager process 66C sends information to load balancer process 66B that causes service load balancer 14 to load balance network traffic for VIP_2 across servers 12B-12C. Because load balancer process 66B has provided two RIPs for servers 12B-12C for VIP_2 to service load balancer 14, service load balancer 14 may generate two entries in hash table 70 that correspond respectively to servers 12B-12C, and therefore network traffic for VIP_2 will be load balanced across RIPs for servers 12B-12C. As service load balancer 14 applies a hashing algorithm to packet flows 60, the packets from packet flows are forwarded by forwarding component 38A, based on lookups in hash table 70, to the corresponding one of servers 12B-12C that corresponds to entries in hash table 70. In this way, new connections are directed to servers 12B-12C while existing connections to server 12A are allowed to expire or disconnect.

In some examples, upon configuring service load balancer 14 to load balance network traffic for VIP_2 across servers 12B-12C, manager process 66C may initiate a timer with a defined period of time and/or begin measuring the count of existing connections to server 12A. Rather than immediately ceasing forwarding network traffic for server 12A and/or removing server 12A from active operation, service load balancer 14 may continue to load balance network traffic for VIP_1 across servers 12A-12C, until the timer expires and/or the number of connections to server 12A falls below a threshold. In some examples, manager process 66C may periodically query and/or receive a count of connections to service router 12A, which manager process 66C may compare to the threshold to determine whether the count is below the threshold. Upon determining the timer expires and/or the number of connections to server 12A falls below a threshold, service load balancer 14 may stop load balancing network traffic for VIP_1 across servers 12A-12C. An administrator or automated component may send one or more commands to server 12A to perform maintenance and/or upgrades. During this time, subscriber requests for VS_1 will be serviced by servers 12B-12C.

Once maintenance and/or upgrades have been applied to server 12A, manager process 66C may be notified that server 12A is ready to be placed back into active operation. For instance, an administrator or automated component may notify manager process 66C directly based on a user input or event, or manager process 66C may receive the notification to place server 12A back into active operation from a remote device, such as server 12A, a client device of the administrator, or any other remote device.

Upon receiving the notification, manager process 66C may generate a third VIP_3 that is mapped to RIPs for servers 12A-12C, or alternative select previously generated VIP_1. Manager process 66C may store an association between the URL_1 and third VIP_3, and may further store associations between VIP_3 and the RIPS for servers 12A-12C. Manager process 66C may send information to DNS servers 17 that indicates a mapping between the URL_1 and VIP_3. DNS servers 17 may update their mappings for the URL_1 to VIP_3, such that DNS servers 17, when receiving requests indicating the URL_1 will provide responses with VIP_3 rather than VIP_2. In this way, DNS servers 17 will resolve the URL_1 to VIP_3 that includes all of servers 12A-12C.

Manager process 66C sends information to load balancer process 66B that causes service load balancer 14 to load balance network traffic for VIP_3 across servers 12A-12C. Because load balancer process 66B has provided three RIPs for servers 12A-12C for VIP_3 to service load balancer 14, service load balancer 14 may generate three entries in hash table 70 that correspond respectively to servers 12A-12C, and therefore network traffic for VIP_3 will be load balanced across RIPs for servers 12A-12C. As service load balancer 14 applies a hashing algorithm to packet flows 60, the packets from packet flows are forwarded by forwarding component 38A, based on lookups in hash table 70, to the corresponding one of servers 12A-12C that corresponds to entries in hash table 70. In this way, new connections are directed to all of servers 12A-12C.

As a result of updating the mapping for URL_1 to VIP_3 in DNS servers 17, requests for the URL_1 will resolve to VIP_3 and not VIP_1 or VIP_2. Accordingly, subscriber devices submitting requests for VS_1, after the URL_1 has been updated to resolve to VIP_3, will submit requests that include VIP_3 as the destination IP address to service load balancer 14. Service load balancer 14, which maps VIP_3 to RIPs for servers 12A-12C, will load balance the requests across servers 12A-12C, including server 12A.

Figure 4:
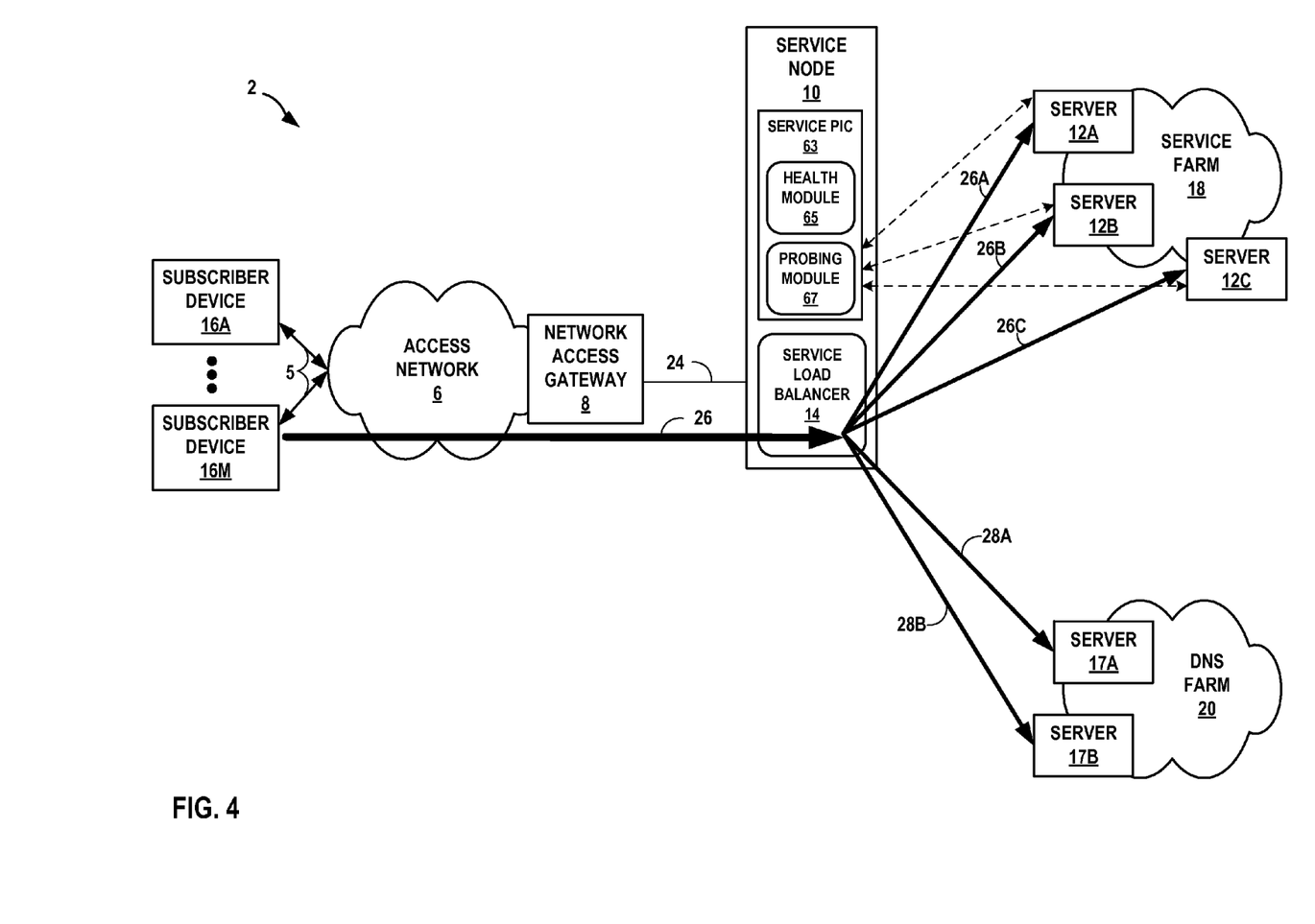
FIG. 4 is block diagram illustrating an example network system having a service node positioned upstream from an access network to apply load balancing services according to techniques described in this disclosure.

As shown in FIG. 3, service node 10 may also include a service physical interface card 63 ("service PIC 63" or "service card 63"), which may be installed along a backplane or other interconnect of service node 10 to perform a variety of operations including, but not limited to health monitoring of servers 12 and network probing of services provided by servers 12. In some cases, service card 63 may be operably coupled to control unit 40 and/or forwarding units 30. By including service card 63 in service node 10, service card 63 may offload processor and/or communications intensive activities, which may include health monitoring of servers 12 and/or network probing of services provided by servers 12. In the example of FIGS. 3 and 4, health module 65 may include a combination of hardware and/or software to receive health metrics from probing module 67 and determine the health of servers 12. Probing module 67 may include a combination of hardware and/or software to receive health metrics from servers 12A-12C. Although illustrated as implemented in service card 63, health module 65 and/or probing module 67 may be implemented control unit 40 and/or forwarding units 30 and/or a combination of control unit 40, forwarding units 30 and/or service card 63.

FIG. 4 is block diagram illustrating an example network system 2 having a service node 10 positioned upstream from an access network 6 to apply load balancing services according to techniques described in this disclosure. FIG. 4 illustrates components described in FIG. 1, and components of FIG. 4 may include the same structure and/or perform the same functionality as like-numbered components of FIG. 1. FIG. 4 further illustrates service card 63, as described in FIG. 3 which includes health module 65 and probing module 67.

In some examples, a real server, such as server 12A, may become overloaded or "hot" with more network traffic than server 12A can handle at an acceptable quality of service. For instance, a large amount of network traffic may disproportionately come from subscriber devices that all hash to service 12A. Conventionally, if a service node could detect server 12A is getting hot, the service node may not have been able to reduce the load to server 12A due to traffic distribution and/or load balancing algorithms and/or the stateless nature of packet handling. Consequently, this led to a hot server, such as server 12A, going down or deteriorating below an acceptable quality of service thereby impacting connections present with server 12A. The failure or deterioration of server 12A may be significant as the hot server may service many users generally. If a hot real server is declared down, a subscriber device with a preexisting connection to server 12A may have to reconnect to a new real server 12B that is not down. The down real server may join service farm 18 again, causing additional churn.

To avoid a hot server from going down completely or deteriorating below an acceptable quality of service level, service node 10 may implement one or more techniques to monitor and proactively react to a hot server. To determine whether the real server is overloaded, service node 10 may perform one or more of the following techniques: service node 10 may (1) perform SNMP probing to determine health metrics that indicate resource utilization on each real server, (2) the real server may provide feedback, such an asynchronous message, that its capacity for handling requests has reached threshold, and/or (3) service node 10 may determine which real server(s) are getting hot based on an amount of traffic that service load balancer 14 is sending to each real server and the amount satisfying a threshold.

In accordance with techniques of the disclosure, probing module 67 may send periodic SNMP formatted messages to servers 12A for health metrics. Example health metrics may include, but are not limited to: packets serviced per time period (e.g., packets per second), processor usage, memory usage, dropped packets, and packet queuing back pressure, to name only a few examples. Each of servers 12A-12C may include a monitoring module comprised of hardware and/or software that maintains the various example health metrics. In response to receiving an SNMP message from probing module 67, a monitoring module of server 12A may generate a response that includes one or more health metrics. Server 12A may send an SNMP message with the health metrics in reply to probing module 67. In some examples, probing module 67 may store the health metrics for later retrieval.

Health module 65 may include one or more thresholds, which may be set by an administrator, hard-coded, or dynamically set based on one or more criteria. In some examples, health module 65 may determine that server 12A is overloaded if one or more health metrics satisfy one or more thresholds. For instance, a health metric may satisfy a threshold if the health metrics is greater than or equal to a threshold. In some examples, a health metric may satisfy a threshold if the health metric is less than or equal to a threshold. In the example of FIG. 4, health module 65 may query probing module 67 or access stored health metrics data for servers 12A-12C directly. Health module 65 may periodically determine whether one or more health metrics satisfy or more thresholds. For instance, health module 65 may determine whether the number of packets dropped per second at server 12A satisfies a threshold and/or whether the processor usage for server 12A satisfies a threshold.

In the example of FIG. 4, service node 10, servers 17 and servers 12 are configured as described in FIG. 1. For instance, service node 10 may associate URL_1 with service VS_1, and associate URL_1 with VIP_1. Service node 10 may associate VIP_1 with RIPs for servers 12A-12C, respectively. Servers 17 may include associations between URL_1 and VIP_1, such that a request for URL_1 resolves to VIP_1.

Health module 65 may determine that the number of packets dropped at server 12A satisfies a threshold and is therefore overloaded. In some examples, health module 65 send a notification to manager process 66C, which performs techniques of this disclosure. Upon determining that server 12A is overloaded, rather than immediately ceasing forwarding of network traffic for VIP_1 or taking server 12A out of active operation (and thereby disconnecting existing subscriber devices from VS_1), manager process 66C may generate a second VIP_2 that is mapped to RIPs for servers 12B-12C but not server 12A. Service node 10 may send information to servers 17 that indicates a mapping between URL_1 and VIP_2. Servers 17 may update its mapping for URL_1 to VIP_2, such that servers 17, when receiving requests indicating URL_1 will provide responses with VIP_2 rather than VIP_1. In this way, servers 17 will resolve URL_1 to a new VIP_2 that does not include the server 12A that will be taken out of active operation.

As a result of updating the mapping for URL_1 to VIP_2 in servers 17, requests for URL_1 will resolve to VIP_2 and not VIP_1. Accordingly, subscriber devices submitting requests for VS_1, after URL_1 has been updated to resolve to VIP_2, will submit requests that include VIP_2 as the destination IP address to service node 10. Service node 10, which maps VIP_2 to RIPs for servers 12B-12C, will load balance the requests across servers 12B-12C, excluding server 12A. In this way, new connections are directed to servers 12B-12C while existing connections to server 12A are allowed to expire or disconnect, thereby allowing server 12A to "cool" or otherwise bring its health metrics to non-overloaded levels as defined by the thresholds of health module 65.

As new connections will use a DNS query and resolve to VIP_2 only, the number of connections to server 12A may decrease, thereby resulting in improved health metrics. Service node 10 may continue to use VIP_2, rather than VIP_1 for URL_1, for a defined period of time and/or until one or more health metrics no longer satisfy a threshold. As an example, after updating the mapping for URL_1 to VIP_2, health module 65 may set a timer with an interval equal to the defined period of time. Prior to expiration of the timer, service node 10 may use VIP_2 for URL_1, but upon expiration of the timer, health module 65 may cause service node 10 (e.g., by sending a message to manager process 66C) to begin using VIP_1 for URL_1, or may use a different VIP_3 for URL_1, where VIP_3 includes the same or different set of servers as VIP_1. In some examples, while VIP_2 is used for URL_1, health module 65 may continue to monitor health metrics of servers 12. Health module 65 may determine that the one or more health metrics that previously satisfied the one or more thresholds are no longer satisfying the one or more thresholds. For instance, health module 65 may determine that the number of packets dropped per second at server 12A is below a threshold.

Upon expiration of the timer and/or improvement in the health metrics to no longer satisfy one or more thresholds, health module may cause service node 10 (e.g., by sending a message to manager process 66C) generate the third VIP_3 that is mapped to RIPs for a different set of servers 12A-12C, or alternatively select previously generated VIP_1. In the example of FIG. 4, health module 65 may cause service node 10 to send information to servers 17 that indicates a mapping between URL_1 and VIP_1. Servers 17 may update its mapping for URL_1 to VIP_1, such that servers 17, when receiving requests indicating URL_1 will provide responses with VIP_1 rather than VIP_2. In this way, servers 17 will resolve URL_1 to VIP_1 that includes all of servers 12A-12C. As a result of updating the mapping for URL_1 to VIP_1 in servers 17, requests for URL_1 will resolve to VIP_1 and not VIP_2. Accordingly, subscriber devices submitting requests for VS_1, after URL_1 has been updated to resolve to VIP_1, will submit requests that include VIP_1 as the destination IP address to service node 10. Service node 10, which maps VIP_1 to RIPs for servers 12A-12C, will load balance the requests across servers 12A-12C, including server 12A. In this way, service node 10 may monitor the health of servers 12A-12C and proactively allow one or more servers to cool down rather than failing completely and going offline.

Other scenarios using health monitoring are also possible using a third VIP_3 rather than reverting from VIP_2 back to VIP_1. Initially, server farm 18 may have 30 real server in regular operation, and URL_1 is configured with VIP_1. An administrator may decide to take 10 real servers down for maintenance. Using techniques of the disclosure, server load balancer 14 may use VIP_2 for the remaining 20 real servers. Service node 10 may determine that 2 real servers are overloaded and need cooling down time. In such cases, rather than using VIP_1 in response to detecting the overloading, service node 10 may generate a VIP_3 that excludes the two overloaded servers from the 20 servers that were previously online. This technique may be applied recursively until all VIP addresses are in use. Once all VIPs are exhausted, service node may no longer apply techniques of this disclosure until one or more VIPs are freed up (i.e., released from use).

In another scenario, initially, server farm 18 may have 30 real servers in regular operation, and URL_1 is configured with VIP_1. Service node 10 may determine that 2 of the real servers have become overloaded. Using techniques of the disclosure, server load balancer 14 may use VIP_2 for the remaining 28 real servers. An administrator may decide to take 10 real servers down for maintenance, while VIP_2 is active. In such cases, service node 10 may generate a VIP_3 that excludes the two overloaded servers and the 10 real servers for maintenance from the 28 servers that were previously online.

In another scenario, initially, server farm 18 may have 30 real servers in regular operation, and URL_1 is configured with VIP_1. Service node 10 may determine that 2 of the real servers have become overloaded. Using techniques of the disclosure, service node 10 may use VIP_2 for the remaining 28 real servers. Service node 10 may determine that 2 additional real servers have become overloaded. In such cases, service node 10 may generate a VIP_3 that excludes the two newly detected overloaded servers from the 28 servers that were previously online.

Figure 5:
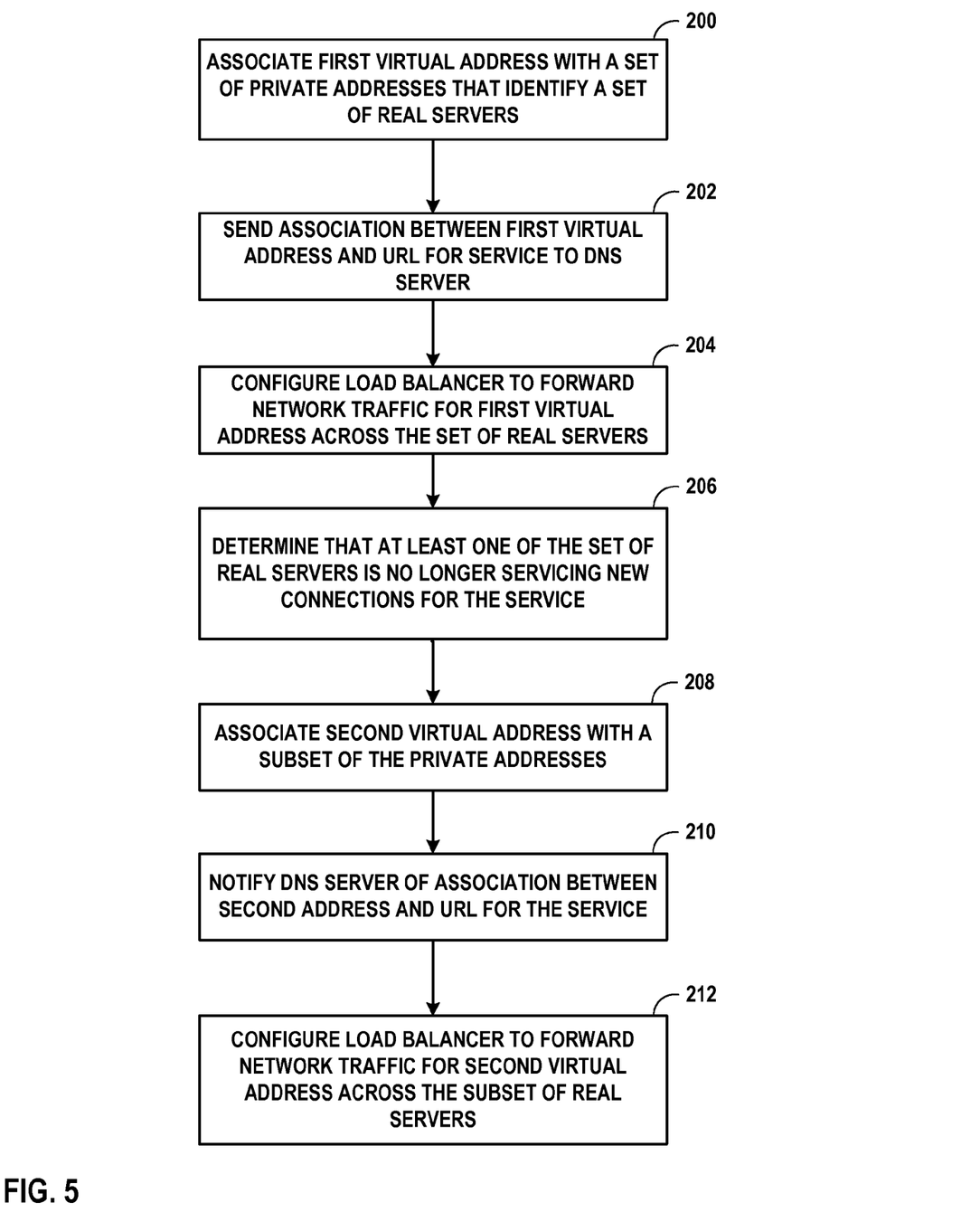
FIG. 5 is a flow chart illustrating example operations of service node that implements adaptive stateless load balancing according to techniques described in this disclosure.

FIG. 5 is a flowchart illustrating example operations of a service node in accordance with techniques of the disclosure. Example operations in accordance with techniques of the disclosure are illustrated for example purposes with respect to service node 10 of FIGS. 1-4.

In the example of FIG. 1, service node 10 may associate a first virtual address VIP_1 with a set of RIPs that correspond respectively to servers 12A-12C (200). As described in FIGS. 1-4, VIP_1 may correspond to a URL_1 for a service VS_1. Service node 10 may also notify servers 17 of the association between VIP_1 and URL_1 (202). In this way, if servers 17 receive requests that include URL_1, the requests will resolve to VIP_1. As such, subscriber devices may access service VS_1 using VIP_1.

Service node 10 may also configure load balancer 14 to load balance network traffic for VIP_1 across servers 12A-12C (204). For instance, as described in FIGS. 1-4, load balancer 14 may generate hash entries that correspond to servers 12A-12C, such that when load balancer 14 applies a hash to a network packet, the generate hash value corresponds to one of the hash entries and the network packet is forwarded to the server associated with the matching hash entry. As a later time, service node 10 may determine at least one of servers 12A-12C will no longer service connections for VS_1 (206). For instance, service node 10 may determine that server 12A is overloaded or is scheduled to be taken offline for maintenance and/or upgrades. In any case, service node 10 may associate a second virtual address, VIP_2, with a subset of RIPs that correspond to real servers 12B-12C but exclude server 12A (208).

Service node 10 may also notify servers 17 of the association between VIP_2 and URL_1 (210). In this way, if servers 17 receive requests that include URL_1, the requests will resolve to VIP_2. As such, subscriber devices may access service VS_1 using VIP_2. Service node 10 may also configure load balancer 14 to load balance network traffic for VIP_2 across servers 12B-12C (212). For instance, as described in FIGS. 1-4, load balancer 14 may generate hash entries that correspond to servers 12B-12C, such that when load balancer 14 applies a hash to a network packet, the generate hash value corresponds to one of the hash entries and the network packet is forwarded to the server associated with the matching hash entry. In this way, new connections may be re-directed away from server 12A, such that server 12A may cease being overloaded and/or have maintenance and/or upgrades performed.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
 mapping, by a service node, a first virtual address for a particular service to a plurality of private addresses that identify a plurality of servers, wherein each server provides the particular service, and wherein a Uniform Resource Locator (URL) for the service resolves to the first virtual address;
 configuring a service load balancer of the service node to load balance network traffic for the first virtual address across the servers and forwarding, by the service node, network traffic for the first virtual address between the servers and a plurality of subscriber devices;
 in response to determining that at least one server of plurality of servers will no longer service new connections for the service from the subscriber devices, associating a second virtual address with a subset of the private addresses that excludes the private address for the at least one server, and causing the URL to resolve to the second virtual address; and
 in response to configuring the service load balancer of the service node to load balance network traffic for the second virtual address across the subset of the servers, forwarding, by the service node, network traffic for the first virtual address between the servers and the subset of the subscriber devices.

2. The method of claim 1, wherein determining that at least one server of plurality of servers will no longer service new connections from the plurality of subscriber devices comprises at least one of:
 detecting a notification that the at least one server will receive at least one of maintenance or an upgrade;
 detecting that a health metric for the at least one server satisfies a first threshold;
 receiving a message from the at least one server that the server cannot handle new connections from the plurality of subscriber devices; or
 determining that an amount of network traffic processed by the service load balancer for the at least one server satisfies a second threshold.

3. The method of claim 1, further comprising:
 in response to configuring the service load balancer of the service node to load balance network traffic for the second virtual address across the subset of the plurality of servers, initiating a timer for a defined period of time;
 while the timer has not expired, forwarding network traffic for the first virtual address between the plurality of servers and a plurality of subscriber devices; and
 in response to determining that the time has expired, ceasing forwarding of network traffic for the first virtual address between the plurality of servers and a plurality of subscriber devices.

4. The method of claim 1, further comprising:
 in response to configuring the service load balancer of the service node to load balance network traffic for the second virtual address across the subset of the plurality of servers, periodically determining whether a number of connections between the plurality of servers and the plurality of subscriber devices is less than a threshold;

while the number of connections between the plurality of servers and the plurality of subscriber devices does not satisfy a threshold, forwarding network traffic for the first virtual address between the plurality of servers and a plurality of subscriber devices; and in response to determining that the number of connections between the plurality of servers and the plurality of subscriber devices satisfies the threshold, ceasing forwarding of network traffic for the first virtual address between the plurality of servers and a plurality of subscriber devices.

5. The method of claim 1, further comprising:

receiving, by the service node, one or more health metrics from the plurality of servers;

determining, by the service node, that at least one of the one or more health metrics from the at least one server satisfies a threshold; and in response to determining that the threshold is satisfied, determining that at least one server of plurality of servers will no longer service new connections for the service from the plurality of subscriber devices.

6. The method of claim 1, wherein causing the URL to resolve to the second virtual address further comprises:

sending, by the service node and to a DNS server that translates to the URL, message that causes the DNS server to resolve the URL to the second virtual address.

7. The method of claim 1, wherein configuring the service load balancer of the service node to load balance network traffic for the first virtual address across the plurality of servers further comprises:

generating, by the service load balancer of the service node, a plurality of hash entries that correspond respectively to the plurality of private addresses of the servers; and configuring, by the service load balancer of the service node, one or more hashing operations that, when applied to network traffic, generate a hash value that corresponds to one of the plurality of hash entries.

8. The method of claim 1, wherein configuring the service load balancer of the service node to load balance network traffic for the second virtual address across the subset of the plurality of servers further comprises:

generating, by the service load balancer of the service node, a plurality of hash entries that correspond respectively to the subset of the plurality of private addresses of the servers; and configuring, by the service load balancer of the service node, one or more hashing operations that, when applied to network traffic, generate a hash value that corresponds to one of the plurality of hash entries.

9. A service node comprising:

one or more processors operably coupled to a memory;

a forwarding unit configured for execution by the one or more processors;

a service load balancer implemented in the forwarding unit;

a control unit, configured for execution by the one or more processors, that maps a first virtual address for a particular service to a plurality of private addresses that identify a plurality of servers, wherein each server provides the particular service, and wherein a Uniform Resource Locator (URL) for the service resolves to the first virtual address;

wherein the control unit configures the service load balancer of the service node to load balance network traffic for the first virtual address across the servers and forwarding, by the service node, network traffic for the first virtual address between the servers and a plurality of subscriber devices;

wherein the control unit, in response to determining that at least one server of plurality of servers will no longer service new connections for the service from the subscriber devices, associates a second virtual address with a subset of the private addresses that excludes the private address for the at least one server, and causes the URL to resolve to the second virtual address; and wherein the forwarding unit, in response to configuring the service load balancer of the service node to load balance network traffic for the second virtual address across the subset of the servers, forwards network traffic for the first virtual address between the servers and the subset of the subscriber devices.

10. The service node of claim 9, wherein the control unit at least:

detects a notification that the at least one server will receive at least one of maintenance or an upgrade;

detects that a health metric for the at least one server satisfies a first threshold;

receives a message from the at least one server that the server cannot handle new connections from the plurality of subscriber devices; or determines that an amount of network traffic processed by the service load balancer for the at least one server satisfies a second threshold.

11. The service node of claim 9, wherein the control unit, in response to configuring the service load balancer of the service node to load balance network traffic for the second virtual address across the subset of the plurality of servers, initiates a timer for a defined period of time;

wherein the forwarding unit, while the timer has not expired, forwards network traffic for the first virtual address between the plurality of servers and a plurality of subscriber devices; and wherein the forwarding unit, in response to determining that the time has expired, ceases forwarding of network traffic for the first virtual address between the plurality of servers and a plurality of subscriber devices.

12. The service node of claim 9, wherein the control unit, in response to configuring the service load balancer of the service node to load balance network traffic for the second virtual address across the subset of the plurality of servers, periodically determines whether a number of connections between the plurality of servers and the plurality of subscriber devices is less than a threshold;

wherein the forwarding unit, while the number of connections between the plurality of servers and the plurality of subscriber devices does not satisfy a threshold, forwards network traffic for the first virtual address between the plurality of servers and a plurality of subscriber devices; and wherein the forwarding unit, in response to determining that the number of connections between the plurality of servers and the plurality of subscriber devices satisfies the threshold, ceases forwarding of network traffic for the first virtual address between the plurality of servers and a plurality of subscriber devices.

13. The service node of claim 9, wherein the control unit:

receives one or more health metrics from the plurality of servers;

determines that at least one of the one or more health metrics from the at least one server satisfies a threshold; and
in response to determining that the threshold is satisfied, determines that at least one server of plurality of servers will no longer service new connections for the service from the plurality of subscriber devices.

14. The service node of claim 9, wherein the control unit sends, to a DNS server that translates to the URL, message that causes the DNS server to resolve the URL to the second virtual address.

15. The service node of claim 9, wherein the service load balancer:
generates a plurality of hash entries that correspond respectively to the plurality of private addresses of the servers; and
configures one or more hashing operations that, when applied to network traffic, generate a hash value that corresponds to one of the plurality of hash entries.

16. The service node of claim 9, wherein the service load balancer:
generates a plurality of hash entries that correspond respectively to the subset of the plurality of private addresses of the servers; and
configures one or more hashing operations that, when applied to network traffic, generate a hash value that corresponds to one of the plurality of hash entries.

17. A non-transitory computer-readable medium comprising instructions for causing at least one programmable processor of a service node to:
maps a first virtual address for a particular service to a plurality of private addresses that identify a plurality of servers, wherein each server provides the particular service, and wherein a Uniform Resource Locator (URL) for the service resolves to the first virtual address;
configures a service load balancer of the service node to load balance network traffic for the first virtual address across the servers and forwarding, by the service node, network traffic for the first virtual address between the servers and a plurality of subscriber devices;
in response to determining that at least one server of plurality of servers will no longer service new connections for the service from the subscriber devices, associates a second virtual address with a subset of the private addresses that excludes the private address for the at least one server, and causing the URL to resolve to the second virtual address; and
in response to configuring the service load balancer of the service node to load balance network traffic for the second virtual address across the subset of the servers, forwards network traffic for the first virtual address between the servers and the subset of the subscriber devices.

18. The non-transitory computer-readable medium of claim 17, wherein the instructions that determine that at least one server of plurality of servers will no longer service new connections from the plurality of subscriber devices further comprises instructions for causing at least one programmable processor of a service node to at least:
detect a notification that the at least one server will receive at least one of maintenance or an upgrade;
detect that a health metric for the at least one server satisfies a first threshold;
receive a message from the at least one server that the server cannot handle new connections from the plurality of subscriber devices; or
determine that an amount of network traffic processed by the service load balancer for the at least one server satisfies a second threshold.

19. The non-transitory computer-readable medium of claim 17 comprising instructions for causing at least one programmable processor of the service node to:
in response to configuring the service load balancer of the service node to load balance network traffic for the second virtual address across the subset of the plurality of servers, initiate a timer for a defined period of time;
while the timer has not expired, forward network traffic for the first virtual address between the plurality of servers and a plurality of subscriber devices; and
in response to determining that the time has expired, cease forwarding of network traffic for the first virtual address between the plurality of servers and a plurality of subscriber devices.

20. The non-transitory computer-readable medium of claim 17 comprising instructions for causing at least one programmable processor of the service node to:
in response to configuring the service load balancer of the service node to load balance network traffic for the second virtual address across the subset of the plurality of servers, periodically determine whether a number of connections between the plurality of servers and the plurality of subscriber devices is less than a threshold;
while the number of connections between the plurality of servers and the plurality of subscriber devices does not satisfy a threshold, forward network traffic for the first virtual address between the plurality of servers and a plurality of subscriber devices; and
in response to determining that the number of connections between the plurality of servers and the plurality of subscriber devices satisfies the threshold, cease forwarding of network traffic for the first virtual address between the plurality of servers and a plurality of subscriber devices.

* * * * *